United States Patent
Kleiman

[19]
[11] Patent Number: 5,950,225
[45] Date of Patent: Sep. 7, 1999

[54] FLY-BY XOR FOR GENERATING PARITY FOR DATA GLEANED FROM A BUS

[75] Inventor: Steven R. Kleiman, Los Altos, Calif.

[73] Assignee: Network Appliance, Inc., Santa Clara, Calif.

[21] Appl. No.: 08/808,396

[22] Filed: Feb. 28, 1997

[51] Int. Cl.⁶ .................................................. G06F 12/00
[52] U.S. Cl. ...................... 711/111; 711/114; 395/182.04
[58] Field of Search ....................... 395/182.04; 711/114, 711/111

[56] References Cited

U.S. PATENT DOCUMENTS

| | | | |
|---|---|---|---|
| 5,675,726 | 10/1997 | Hohenstein et al. | 395/182.04 |
| 5,737,744 | 4/1998 | Callison et al. | 711/114 |
| 5,742,752 | 4/1998 | DeKoning | 395/182.04 |

Primary Examiner—John W. Cabeca
Assistant Examiner—David Langjahr
Attorney, Agent, or Firm—Swernofsky Law Group

[57] ABSTRACT

The invention provides a method and system for performing XOR operations without consuming substantial computing resources. A specialized processor is coupled to the same bus as a set of disk drives; the specialized processor reviews data transfers to and from the disk drives and performs XOR operations on data transferred to and from the disk drives without requiring separate transfers. The specialized processor maintains an XOR accumulator which is used for XOR operations, which records the result of XOR operations, and which is read out upon command of the processor. The XOR accumulator includes one set of accumulator registers for each RAID stripe, for a selected set of RAID stripes. A memory (such as a contents-addressable memory) associates one set of accumulator registers with each selected RAID stripe.

11 Claims, 3 Drawing Sheets

FLY-BY XOR FOR GENERATING PARITY FOR DATA GLEANED FROM A BUS

BACKGROUND OF THE INVENTION

1. Field of the Invention

The invention relates to storage systems.

2. Related Art

One known type of storage system is known as "RAID", in which data is distributed across multiple disk drives and stored so as to be recoverable in the event that one of those disk drives, or one or more of its storage blocks, fails with lost data. To store data for later recovery, RAID systems record data along with parity information, so that data can be recovered from the parity information. For example, in one type of RAID system, a set of five disks is used to record four blocks of data and one block of parity information in a unit known as a "stripe".

One problem which has arisen in the art is that RAID systems which record parity information require computation of parity information quickly and often. For example, operations which write to a stripe require at least one set of parity information to be computed. Computing parity information makes substantial use of the XOR (exclusive-or) function. This can require allocation of substantial computational resources, such as processor cycles, cache locations, and memory access cycles.

One possible technique for computing parity information is to provide software for controlling a processor to compute the XOR function. This technique has several design alternatives, such as those involving attempts to scheduling processor instructions so as to avoid register conflict and unnecessary waiting, and reducing cache misses so as to avoid unnecessary memory transfers and unnecessary waiting by the processor. While this technique achieves the goal of computing parity information, it suffers from the drawbacks that it requires substantial computing resources (processor cycles, cache locations, memory transfers).

Another possible technique for computing parity information is to provide a second processor, with an independent memory, for performing XOR operations. The second processor is coupled to the main memory (that is, memory used by the first processor) using a DMA connection, which retrieves inputs for XOR operations from memory using DMA operations, thus leaving the first processor to perform other tasks. While this technique achieves the goal of computing parity information, it also suffers from the drawbacks that it requires substantial memory transfers and use of the system bus, even while relieving the first processor of some of its burden.

Accordingly, it would be advantageous to provide a method and system for performing XOR operations while consuming fewer computing resources. This advantage is achieved in an embodiment of the invention in which a specialized processor reviews memory and disk accesses as they are transmitted on a system bus, which performs XOR operations, records the results of those XOR operations, and which outputs the results of those XOR operations on processor command.

SUMMARY OF THE INVENTION

The invention provides a method and system for performing XOR operations without consuming substantial computing resources. A specialized processor is coupled to the same bus as a set of disk drives; the specialized processor reviews data transfers to and from the disk drives and performs XOR operations on data transferred to and from the disk drives without requiring separate transfers.

In a preferred embodiment, the specialized processor maintains an XOR accumulator which is used for XOR operations, which records the result of XOR operations, and which is read out upon command of the processor. The XOR accumulator includes one set of accumulator registers for each RAID stripe, for a selected set of RAID stripes. A memory (such as a contents-addressable memory) associates one set of accumulator registers with each selected RAID stripe.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

System Components

Figure 1:
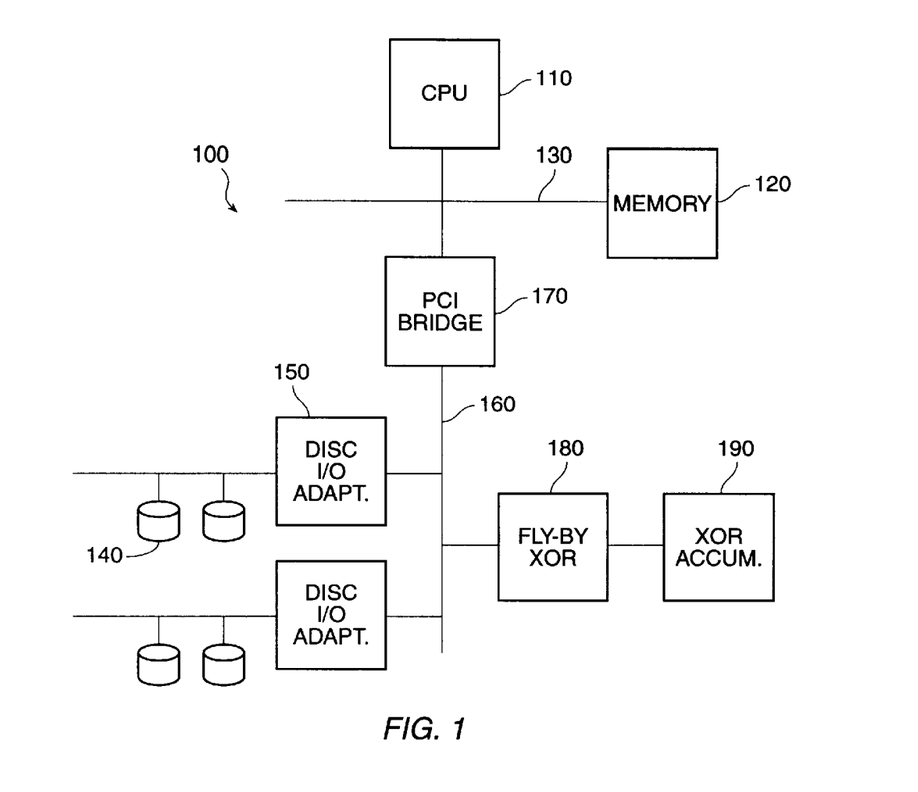
FIG. 1 shows a block diagram of a system for performing fly-by XOR.

FIG. 1 shows a block diagram of a system for performing fly-by XOR.

A system 100 includes at least one processor 110, a memory 120, and a system bus 130 for coupling the processor 110 and the memory 120. Although only one processor 110 is shown, in embodiments which may be preferred for some applications, more than one processor 110 may be coupled to the system bus 130 and the processors 110 co-operate in their operations.

The system 100 also includes a plurality of disk drives 140 and at least one disk I/O adapter 150, coupled to the disk drives 140, for controlling the disk drives 140 and coupling data between the disk drives 140 and the system bus 130 using a mezzanine bus 160.

In a preferred embodiment, the mezzanine bus 160 is a PCI bus, as defined by known standards for PCI busses, and is coupled to the system bus 130 using a PCI bridge 170.

Although in a preferred embodiment the mezzanine bus 160 is a PCI bus, the invention is not restricted to use of a PCI bus or any other particular type of bus. Similarly, although the mezzanine bus 160 is further described herein as a 32-bit bus, the invention is not restricted to use of a 32-bit bus, and could also be implemented with another bus width, such as a 64-bit bus. Such alternatives would not require undue experimentation or invention.

A fly-by XOR element 180 is coupled to the mezzanine bus 160, so as to glean data from data transfers which use the mezzanine bus 160. The fly-by XOR element 180 uses an XOR buffer 190 for saving partial and final results of XOR operations.

When the processor 110 directs the transfer of data between the memory 120 and one or more of the disk drives 140, the data is transferred using the system bus 130, the PCI bridge 170, and the mezzanine bus 160. As the data is transferred using the mezzanine bus 160, the fly-by XOR element 180 reads the data (without interference with the data transfer) and adds it to one of the XOR accumulators (see FIG. 2) in the XOR buffer 190. When a RAID stripe is read or written, either entirely or partially, the fly-by XOR element 180 thus dynamically computes a set of parity information for the RAID stripe, without requiring additional resources from any part of the system 100. No additional data transfers are required, and the processor 110 and the memory 120 are not required to perform these XOR operations.

When the processor 110 so directs, the fly-by XOR element 180 will readout accumulated parity information from one of the XOR accumulators in the XOR buffer 190, such as for writing the parity information out to a storage block in the RAID stripe which has been read or written. The accumulated parity information from the XOR buffer 190 can also be used to reconstruct or repair data in the RAID stripe when one of the disk drives 140 in the RAID stripe loses all or part of one of the storage blocks in the RAID stripe.

System Operation

Figure 2:
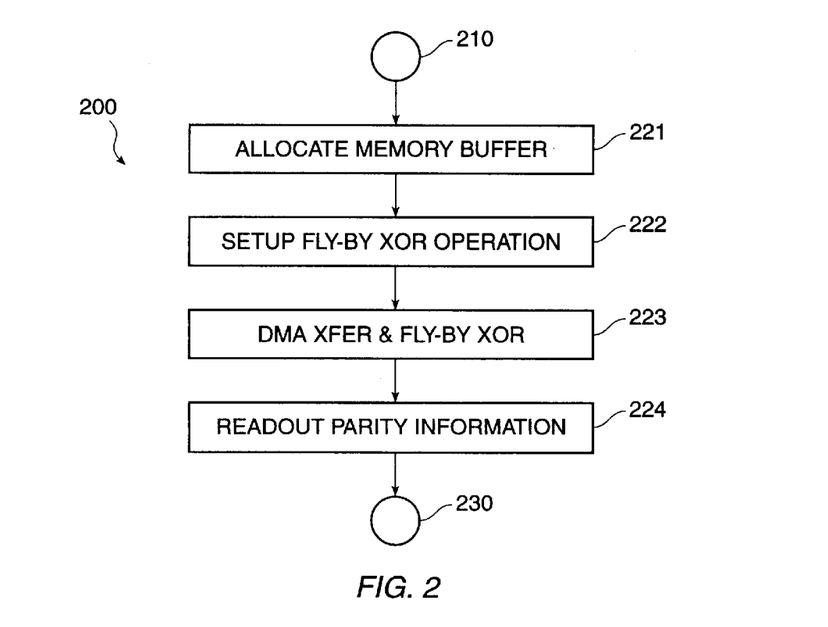
FIG. 2 shows a flowchart of a method of operating a system for performing fly-by XOR.

FIG. 2 shows a flowchart of a method of operating a system for performing fly-by XOR.

A method 200 of operation of the fly-by XOR element 180 includes a sequence of steps to be performed by the processor 110, the disk drives 140, and the fly-by XOR element 180.

At a flow point 210, the system 100 is about to perform an XOR operation on a RAID stripe.

At a step 221, the processor 110 allocates a memory buffer in the memory 120, and sets up data to be DMA transferred to or from the memory buffer and one of the disk drives 140.

At a step 222, the processor 110 transmits a memory address of the memory buffer to the fly-by XOR element 180 and directs the fly-by XOR element 180 to recognize data transferred to or from that memory buffer. The processor 110 also allocates one of the XOR accumulator buffers in the XOR buffer 190 to accumulate the results of the XOR operation.

At a step 223, the DMA transfer is performed. The fly-by XOR element 180 monitors the mezzanine bus 160 and attempts to recognize transfers to or from the memory buffer. When the fly-by XOR element 180 recognizes such a transfer, it copies the data being transferred and adds it (by performing an XOR operation) to the accumulated parity information in the associated XOR accumulator buffer. When all data for the recognized memory buffer has been transferred, the associated XOR accumulator buffer holds the computed parity for the RAID stripe.

At a step 224, the processor 110 directs the fly-by XOR element 180 to readout the accumulated parity information from the associated XOR accumulator buffer, either to a memory buffer in the memory 110 or to a storage block on one of the disk drives 140. In either case, readout from the fly-by XOR element 180 is performed by processor reads or DMA transfer to one of the disk drives 140. In a preferred embodiment, readout of the accumulated parity information causes the associated XOR accumulator buffer to be reset to zero.

At a flow point 230, the XOR operation on the RAID stripe is complete, and the system 100 can continue with another RAID stripe.

In a preferred embodiment, the processor 110 can perform an XOR operation without actually transferring data from one of the disk drives 140 to a memory buffer in the memory 120. This is referred to herein as a transfer to a "null" memory buffer, because the operation proceeds as if it were a transfer to a memory buffer in all ways except that the data is not actually stored in the memory 120. It is advantageous to be able to transfer to a null memory buffer because there are disk operations for a RAID stripe in which it is desired to read or write less than all of the storage blocks of the RAID stripe as it is stored on the disk drives 140, but in which it is necessary to compute parity information for the entire RAID stripe.

For example, when it is desired to write just one storage block of a RAID stripe, it is necessary to write to both that storage block and the parity information storage block. In known RAID storage systems, it would be necessary to first read both the current parity and data blocks from the disks into memory so that the processor may then compute the new parity information. However, with the invention, these blocks could be transferred to a null memory buffer, so as not to use resources of the processor 110 or the memory 120, but so as to compute parity information using the fly-by XOR element 180.

Moreover, in a preferred embodiment, writing just one storage block of a RAID stripe is performed in fewer steps: (1) the old storage block data and the old parity block data is transferred to a null memory buffer, so as to accumulate parity information using the fly-by XOR element 180. (2) The new storage block data is written into the storage block, so as to both write the storage block and simultaneously accumulate parity information using the fly-by XOR element 180. (3) The accumulated parity information is written into the parity storage block from the XOR buffer 190. The resources of the processor 110 and the memory 120 are not needed for these operations.

To perform a transfer to a null memory buffer, at the step 221, the processor 110 does not allocate a memory buffer in the memory 120, and sets up data to be DMA transferred between one of the disk drives 140 and a memory address which is not recognized by the memory 120. At the step 223, the DMA transfer is performed and the fly-by XOR element 180 monitors the mezzanine bus 160, but the memory 120 does not capture any of the data which is "transferred" to the null memory buffer.

First Fly-By XOR Element

Figure 3:
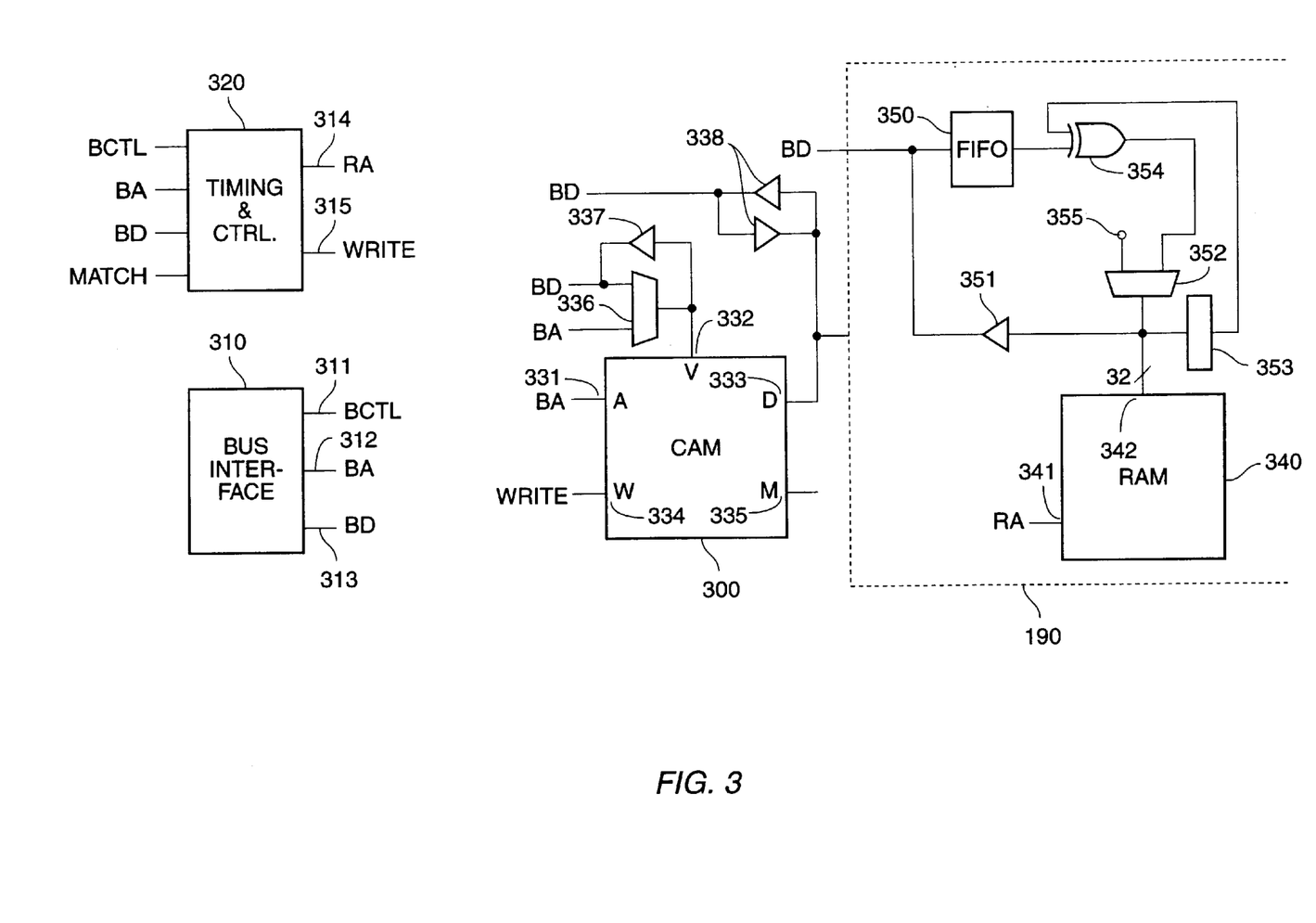
FIG. 3 shows a block diagram of a first fly-by XOR element.

FIG. 3 shows a block diagram of a first fly-by XOR element 180.

A first fly-by XOR element 180 includes a bus interface 310, a timing and control element 320, and a content-addressable memory (CAM) 330 and associated elements. The XOR buffer 190 is coupled to the fly-by XOR element 180 and includes a random access memory (RAM) 340, a FIFO queue 350, and associated elements. Although the XOR buffer 190 conceptually includes the RAM 340, in a preferred embodiment, the RAM 340 is implemented using external RAM circuitry, while the FIFO 350 and associated elements are implemented with other circuitry of the fly-by XOR element 180 in an ASIC.

The bus interface 310 and the timing and control element 320 provide an interface between the fly-by XOR element 180 and the mezzanine bus 160. The interface includes a set of control paths 311 communicating control signals used by the mezzanine bus 160, a bus address (BA) path 312 communicating a bus address value having bits 0 through 31, and a bus data (BD) path 313 communicating a bus data value having bits 0 through 31. Communication using a PCI bus is known in the art of computer system design.

In alternative embodiments where the mezzanine bus 160 is other than a PCI bus, or is other than 32 bits wide, the bus data value has other bit identifiers (such as bits 0 through 63), and communication occurs using another bus protocol than PCI.

The XOR buffer 190 includes a random access memory (RAM) 340, which provides a set of 32 XOR accumulator buffers, each of which is 1024 entries long by 4 bytes (32 bits) wide, thus 4K bytes in size. Therefore, up to 32 different RAID stripes can have XOR accumulation performed simultaneously by the fly-by XOR element 180.

The XOR buffer 190 also includes a FIFO queue 350, which provides for inputting sequential words of bus data values and performing the XOR operation on those sequential words, so as to accumulate parity information in one of the 32 XOR accumulator buffers in the RAM 340.

The CAM 330 provides a set of 256 entries, each of which associates a 20-bit bus address value with a 5-bit associated address of one of the 32 XOR accumulator buffers in the RAM 340. The CAM 330 includes an address input port 331, for selecting one of the 256 entries in the CAM 330, a 20-bit tag port 332, for providing a 20-bit tag to be matched by the CAM 330, a 5-bit value port 333, for providing a 5-bit value associated by the CAM 330 with the 20-bit tag, a write control port 334, for receiving a write control signal, and a match control port 335, for providing a match control signal.

The timing and control element 320 also receives the match control signal from the match control port 335, and provides a 15-bit RAM address path (RA) 314, for addressing the RAM 340, and a write control path 315, for controlling the CAM 330.

Bits 12 through 31 of the bus address path 312 and bits 12 through 31 of the bus data path 313 (thus, in each case the high-order 20 bits) are coupled to inputs of a CAM multiplexer 336, an output of which is coupled to the tag port 332 of the CAM 330. The tag port 332 also provides an output 20-bit tag which can be coupled to the bus data path 313 using a driver 337. The associated 5-bit value at the value port 333 is coupled to the XOR buffer 190, and is also coupled to the bus data path 313 using a pair of drivers 338.

The XOR buffer 190 includes the RAM 340, which includes a RAM address port 341, for receiving the 15-bit RAM address value, and a RAM data port 342, for providing a 32-bit RAM data value stored at the associated location in the RAM 340. The RAM 340 is conceptually divided into 32 separate XOR accumulator buffers, each of which comprises 1K 32-bit words (thus, 4K bytes) and occupies a set of locations in the RAM 340 each having its 5-bit XOR accumulator buffer number (0 through 31) as the high-order bits of the RAM address value.

The associated 5-bit value at the value port 333 is coupled to the RAM address port 341, and provides high-order 5 bits for addressing words in the RAM 340. Bits 2 through 11 of the bus address path 312 (thus, the low-order 10 bits for addressing a 4-byte word) provide the low-order 10 bits for addressing words in the RAM 340 and are also coupled to the RAM address port 341. Thus, the RAM 340 receives a 15-bit address at the RAM address port 341 and provides a 32-bit data word output at the RAM data port 342.

The RAM data port 342 is coupled using a driver 351 to the bus data path 313 (and also to an input of the FIFO queue 350), to an output of a FIFO multiplexer 352, and to an input of a FIFO register 353. The FIFO queue 350 has an output coupled to an XOR operator 354, which includes a set of 32 XOR gates for performing an XOR operation in parallel on an entire 32-bit word. The FIFO multiplexer 352 is coupled to an output of the XOR operator 354 and to a "zero" input 355.

To allocate an XOR accumulator buffer for a new RAID stripe as in the step 221 and the step 222, the timing and control element 320 causes the CAM 330 to be loaded with a 20-bit memory address for a memory buffer in the memory 120 (or a 20-bit memory address for a null memory buffer), and associates that 20-bit memory address with a 5-bit identifier for one of the 32 XOR accumulator buffers. Bits 2 through 9 of the bus address path 312 are coupled to the address input port 331 and provide the address of a new entry for the CAM 330. The CAM multiplexer 336, under control of the timing and control element 320, selects the bus data path 313 for coupling to the tag port 332. The CAM 330 inserts bits 12 through 31 of the bus data value from the bus data path 313 as a new 20-bit tag at the address specified at the address input port 331, and bits 0 through 4 of the bus data value from the bus data path 313 as a new 5-bit value. The processor 110 can also read a selected entry in the CAM 330 for diagnostic purposes.

To monitor the mezzanine bus 160 as in the step 223, the timing and control element 320 selects the bus address path 312 for coupling to the tag port 332. When the high-order 20 bits of a memory address (or an address within a null memory buffer) appearing on the mezzanine bus 160 matches one of the 20-bit tags in the CAM 330, the CAM 330 matches bits 12 through 31 of the bus address and associates a 5-bit value with that 20-bit tag.

The associated 5-bit value is used to select one of the 32 XOR accumulator buffers in the RAM 340, while bits 2 through 11 of the bus address path 312 are used to select an individual word in the XOR accumulator buffer in the RAM 340, so that the data values on the mezzanine bus 160 are and selected bit ranges are shown for the bus address (BA) path 312 and bus data (BD) path 313.

TABLE 3-1

| Address Range | Register | Read/Write | Data/Operation |
|---|---|---|---|
| 000000 . . . 0000FF | PCI bus register | RW | as specified by PCI bus protocol |
| 010000 . . . 0103FF | CAM entry | RW | read or write CAM entry<br>BA<2:9> CAM entry number<br>BD<0:4> XOR accumulator number<br>BD<12:31> memory buffer address |
| / / / | | | |
| 100000 . . . 10FFFF | XOR accum. buffer | R | read and clear XOR accum. buffer<br>BA<12:16> XOR accum. buffer number<br>BD<0:31> results |
| 100000 . . . 10FFFF | XOR accum. buffer | W | direct XOR to XOR accum. buffer<br>BA<12:16> XOR accum. buffer number<br>BD<0:31> data for direct XOR |
| 000000 . . . FFFFFF | XOR accum. buffer | X | fly-by XOR re memory buffer<br>BA<12:31> memory address to match<br>BD<0:31> data for fly-by XOR |
| 200000 . . . 7FFFFF | null memory buffer | W | fly-by XOR re null memory buffer<br>BA<12:31> memory address to match<br>BD<0:31> data for fly-by XOR |
| / / / | | | | read into the FIFO queue 350 word by word. The timing and control element 320 sequences each word in the FIFO queue 350, in conjunction with a corresponding word read from the RAM 340 into the FIFO register 353, through the XOR operator 354, so as to perform an XOR operation on data in the associated XOR accumulator buffer in the RAM 340 with data in the FIFO queue 350. The timing and control element 320 then causes the results of the XOR operation to be written back into the associated XOR accumulator buffer in the RAM 340.

To readout the accumulated parity information as in the step 224, the timing and control element 320 selects the bus address path 312 for coupling to the RAM address port 341, so as to readout each word in the XOR accumulator buffer in the RAM 340 in sequence onto the bus data path 313, while DMA transfer occurs either to the memory 120 or to one of the disk drives 140. Most commonly, DMA transfer is directly to one of the disk drives 140, but can be to the memory 120 if the processor 110 must operate on the parity information. The processor 110 can also read the RAM 340 entries directly for diagnostic purposes or if it is otherwise desirable to read or operate on the parity information while in the XOR buffer 190. The timing and control element 320 simultaneously writes zero values into each word in the XOR accumulator buffer in the RAM 340, so as to cause the XOR accumulator buffer to be reset to a uniform zero value.

The processor 110 can also write directly to selected locations in the RAM 340 so as to perform an XOR operation directly between the contents of the XOR buffer 190 and selected information. This is similar to the XOR operation performed as in the step 223. However, bits 12 through 16 of the bus data path 313 are coupled to the RAM address port 341 instead of the 5-bit value output from the value port 333 of the CAM 330.

Figure 4:
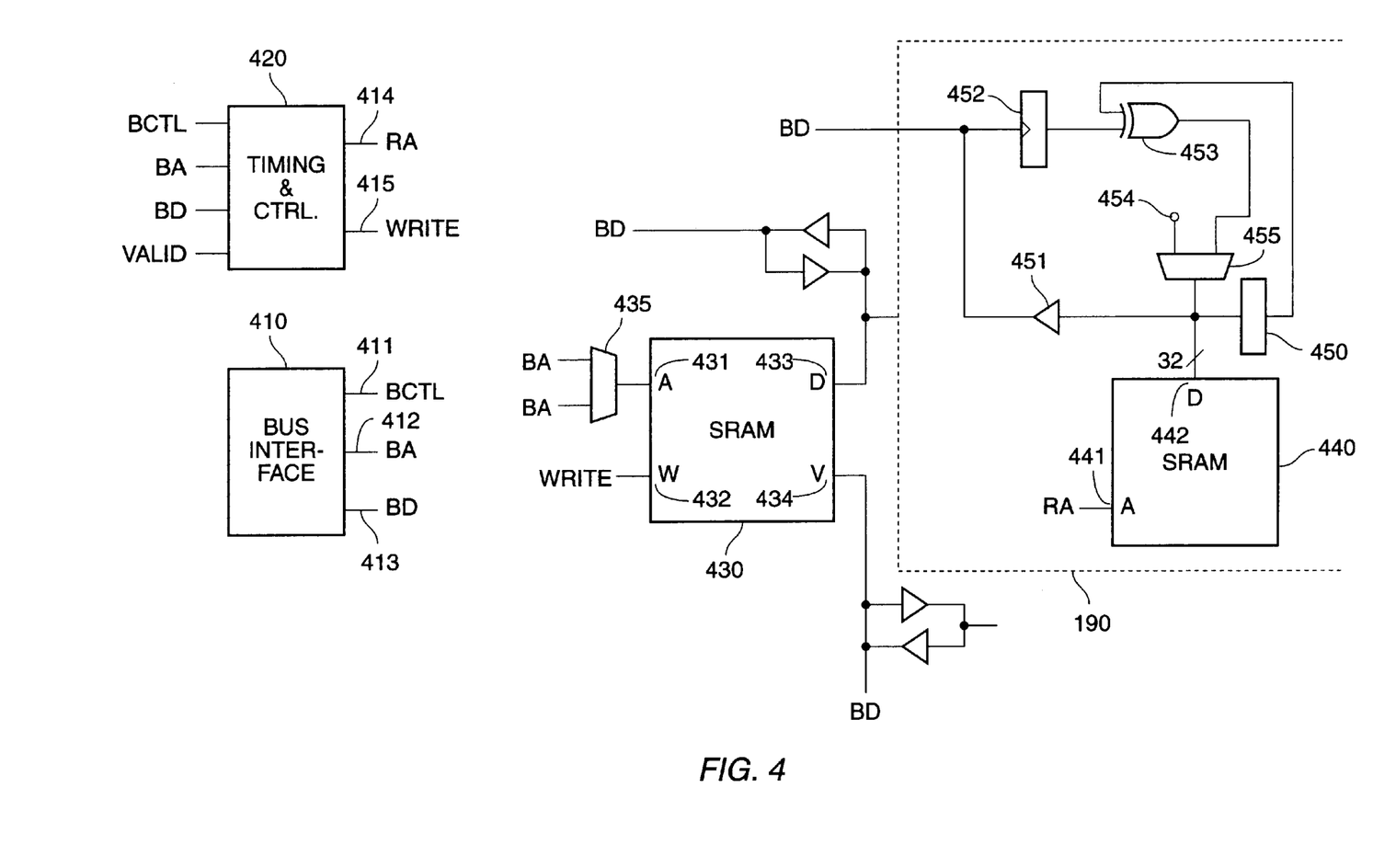
FIG. 4 shows a block diagram of a second fly-by XOR element.

In a preferred embodiment, values on the bus address path 312 and bus data path 313 are used as shown in table 3-1. In table 3-1, address range values are shown in hexadecimal, FIG. 4 shows a block diagram of a second fly-by XOR element.

A second fly-by XOR element 180 and XOR buffer 190 are similar to the first fly-by XOR element 180 and XOR buffer 190. However, a first SRAM 430 is used instead of the CAM 330 and a second SRAM 440 is used instead of the RAM 340. Similar to the first fly-by XOR element 180 and XOR buffer 190, although the XOR buffer 190 conceptually includes the SRAM 430, in a preferred embodiment, the SRAM 430 is implemented using external SRAM circuitry, while other elements of the XOR buffer 190 are implemented with other circuitry of the fly-by XOR element 180 in an ASIC.

The bus interface 410 for the second fly-by XOR element 180 is similar to the bus interface 310 for the first fly-by XOR element 180; the timing and control element 420 for the second fly-by XOR element 180 is similar to the timing and control element 320 for the first fly-by XOR element 180. The bus interface 410 and the timing and control element 420 similarly provide an interface between the fly-by XOR element 180 and the mezzanine bus 160. The interface includes a set of control paths 411 communicating control signals used by the mezzanine bus 160, a bus address (BA) path 412 communicating a bus address value having bits 0 through 31, and a bus data (BD) path 413 communicating a bus data value having bits 0 through 31.

The first SRAM 430 comprises a 1 megaword by 5-bit word memory, and includes a first SRAM address input port 431, a write control input port 432, for receiving a write control signal, a 5-bit first SRAM data port 433, and a valid control output port 434 (an additional data bit output port for the SRAM 430), for providing an output data bit used as a valid control signal. Bits 2 through 21 of the bus address path 412 are coupled to a first input of an SRAM multiplexer 435, bits 12 through 31 of the bus address path 412 are coupled to a second input of the SRAM multiplexer 435, and an output of the SRAM multiplexer 435 is coupled to the first SRAM address input port 431.

The timing and control element 420 also receives the valid control signal from the valid control output port 434, and provides a 15-bit RAM address path (RA) 414, for addressing the second SRAM 440, and a write control path 415, for controlling the first SRAM 430.

The XOR buffer 190 includes the second SRAM 440, which includes a second SRAM address input port 441, for receiving the 15-bit second SRAM address value, and a second SRAM data port 442, for providing a 32-bit SRAM data value stored at the associated location in the second SRAM 440. Similar to the RAM 340, the second SRAM 440 is conceptually divided into 32 separate XOR accumulator buffers, each of which comprises 1K 32-bit words (thus, 4K bytes) and occupies a set of locations in the second SRAM 440 each having its 5-bit XOR accumulator buffer number (0 through 31) as the high-order bits of the second SRAM address value.

Instead of associating a 5-bit value with one of a set of 256 20-bit tags, the first SRAM 430 maintains a table having one entry for each possible 20-bit tag, a valid bit for each entry, and for those entries with the valid bit set, a 5-bit value. Each 20-bit tag represents a possible high-order 20 bits of an address of a memory buffer in the memory 120 (or an address for a null memory buffer). Each 5-bit value represents a possible XOR accumulator buffer number.

The associated 5-bit value at the first SRAM data port 433 is coupled to the second SRAM address port 441, and provides high-order 5 bits for addressing words in the second SRAM 440. Bits 2 through 11 of the bus address path 412 (thus, the low-order 10 bits for addressing a 4-byte word) provide the low-order 10 bits for addressing words in the second SRAM 440 and are also coupled to the second SRAM address port 441. Thus, the second SRAM 440 receives a 15-bit address at the second SRAM address port 441 and provides a 32-bit data word output at the second SRAM data port 442.

The second SRAM data port 442 is coupled to a first register 450 and using a driver 451 to the bus data path 413 (and also to a second register 452). The first register 450 and the second register 452 are coupled to inputs of an XOR operator 453, which includes a set of 32 XOR gates for performing an XOR operation in parallel on an entire 32-bit word. An output of the XOR operator 453 and a "zero" input 454 are coupled to an input of an XOR multiplexer 455; an output of the XOR multiplexer 455 is also coupled to the second SRAM data port 442.

In alternative embodiments, the second register 452 may be replaced with a FIFO or other circuit structure, particularly if the second SRAM 440 is not sufficiently fast to have results ready timely for the second register 452.

To allocate an XOR accumulator buffer for a new RAID stripe as in the step 221 and the step 222, the timing and control element 420 causes the first SRAM 430 to be coupled to a 20-bit memory address for a memory buffer in the memory 120 (or a 20-bit memory address for a null memory buffer), and stores a 5-bit identifier for one of the 32 XOR accumulator buffers in the location specified by that 20-bit memory address.

The SRAM multiplexer 435, under control of the timing and control element 420, selects bits 2 through 21 of the bus address path 412 for coupling to the first SRAM address input port 431, stores bits 0 through 4 of the bus data value from the bus data path 413 as a new 5-bit value for that location, and sets the valid bit for that location. The processor 110 can also read a selected entry in the first SRAM 430 for diagnostic purposes.

To monitor the mezzanine bus 160 as in the step 223, the timing and control element 420 selects the bus address path 412 for coupling to the first SRAM address input port 431. The high-order 20 bits of a memory address (or an address within a null memory buffer) appearing on the mezzanine bus 160 are used to address the first SRAM 430; when the valid bit is set for that location, the first SRAM data port 433 provides a 5-bit value for an XOR accumulator buffer associated with that 20-bit memory address.

The associated 5-bit value is used to select one of the 32 XOR accumulator buffers in the second SRAM 440, while bits 2 through 11 of the bus address path 412 are used to select an individual word in the XOR accumulator buffer in the second SRAM 440. Data values in the second SRAM 440 are read out to the first register 450 word by word, while data values are copied from the mezzanine bus 160 to the second register 452 word by word. The XOR operator 453 performs the XOR operation on data in the XOR accumulator buffer with data traversing the mezzanine bus 160. Output from the XOR operator 453 is written back to the second SRAM 440 using the second SRAM data port 442.

Similar to the first fly-by XOR element 180, to readout the accumulated parity information as in the step 224, the timing and control element 420 selects the bus address path 412 for coupling to the second SRAM address port 441, so as to readout each word in the XOR accumulator buffer in the second SRAM 440 in sequence onto the bus data path 413, while DMA transfer occurs either to the memory 120 or to one of the disk drives 140. Similar to the first fly-by XOR element 180, the processor 110 can also read the second SRAM 440 entries directly for diagnostic purposes or if it is otherwise desirable to read or operate on the parity information while in the XOR buffer 190. Similar to the first fly-by XOR element 180, the timing and control element 420 simultaneously writes zero values into each word in the XOR accumulator buffer in the second SRAM 440, so as to cause the XOR accumulator buffer to be reset to a uniform zero value.

Similar to the first fly-by XOR element 180, the processor 110 can also write directly to selected locations in the second SRAM 440 so as to perform an XOR operation directly between the contents of the XOR buffer 190 and selected information.

The second fly-by XOR element 180 has the additional feature that the number of memory buffers in the memory 120 (or null memory buffers) which can be associated with an XOR accumulator buffer is not limited by the number of entries in the CAM 330. This allows the use of RAID stripes of arbitrary width, where up to 32 RAID stripes are being used simultaneously. The second fly-by XOR element 180 can be modified to alter the number of XOR accumulation buffers by altering the width of the first SRAM data port 433 and the size of the second SRAM 440.

In a preferred embodiment, values on the bus address path 412 and bus data path 413 are used as shown in table 4-1.

In table 4-1, address range values are shown in hexadecimal, and selected bit ranges are shown for the bus address (BA) path 312 and bus data (BD) path 313.

TABLE 4-1

| Address Range | Register | Read/Write | Data/Operation |
|---|---|---|---|
| 000000 . . . 0000FF | PCI bus register | RW | as specified by PCI bus protocol |
| 010000 . . . 0103FF | table entry | RW | read or write table entry<br>BD<0:4> XOR accumulator number<br>BD<8> table entry valid<br>BD<12:31> memory buffer address |
| 100000 . . . 10FFFF | XOR accum. buffer | R | read and clear XOR accum. buffer<br>BA<12:16> XOR accum. buffer number<br>BD<0:31> results, |
| 100000 . . . 10FFFF | XOR accum. buffer | W | direct XOR to XOR accum. buffer<br>BA<12:16> XOR accum. buffer number<br>BD<0:31> data for direct XOR |
| 000000 . . . FFFFFF | XOR accum. buffer | X | fly-by XOR re memory buffer<br>BA<12:31> memory address to match<br>BD<0:31> data for fly-by XOR |
| / / / | | | |
| 200000 . . . 7FFFFF | null memory buffer | W | fly-by XOR re null memory buffer<br>BA<12:31> memory address to match<br>BD<0:31> data for fly-by XOR |

Preferred Embodiments

The first fly-by XOR element 180 and its associated XOR buffer 190, and the second fly-by XOR element 180 and its associated XOR buffer 190, are preferred embodiments. It will be clear to those skilled in the art, after perusing this application, that the first fly-by XOR element 180 and its associated XOR buffer 190 would be preferred for some sets of design constraints, and that the second fly-by XOR element 180 and its associated XOR buffer 190 would be preferred for other sets of design constraints.

For example, the first fly-by XOR element 180 and its associated XOR buffer 190 would be preferred in those cases where a relatively small but complex CAM 330 is less costly than an additional relatively large external SRAM 430, while the second fly-by XOR element 180 and its associated XOR buffer 190 would be preferred in those cases in the opposite situation, or where the stripes for the RAID subsystem are relatively wide.

Alternative Embodiments

Although preferred embodiments are disclosed herein, many variations are possible which remain within the concept, scope, and spirit of the invention, and these variations would become clear to those skilled in the art after perusal of this application.

I claim:

1. A method including the steps of
   reading at least one block of data from a stripe, said stripe including one storage block on each one of a plurality of mass storage devices, said step of reading including the step of transferring data from said block of data over a bus; and
   while performing said step of transferring said block of data over said bus, accumulating a result of an XOR operation without interfering with said step of transferring.
2. A method as in claim 1, wherein
   said step of reading includes copying said block of data to a memory coupled to a processor using a memory bus; said step of transferring data from said block of data includes the step of transferring data over a secondary bus other than said memory bus; and
   said step of accumulating is responsive to said step of transferring said block of data over said secondary bus.
3. A method as in claim 1, wherein
   said step of reading includes the step of initiating a DMA transfer from one of said plurality of mass storage devices;
   said step of transferring said block of data includes the step of performing said DMA transfer; and
   said step of accumulating is responsive to said DMA transfer.
4. A method as in claim 1, wherein
   said step of reading includes the step of initiating a DMA transfer from one of said plurality of mass storage devices to a selected memory location; and
   said selected memory location is ignored by said memory, whereby said DMA transfer to said selected memory location to accumulates said result without storing said block of data in said memory.
5. In a system having a processor, a memory, a memory bus coupling said processor and said memory, a plurality of mass storage devices, and a secondary bus coupling said plurality of mass storage devices to said memory bus, a method including the steps of
   initiating a DMA operation between at least one of said plurality of mass storage devices and a buffer location in said memory;
   monitoring said secondary bus for a plurality of addresses in said buffer location;
   copying data associated with said plurality of addresses into an XOR buffer without interfering with said DMA operation; and
   accumulating a result of an XOR operation for said data.
6. A method as in claim 5, wherein
   said buffer location is ignored by said memory, whereby said DMA operation to said buffer location to accumulates said result without storing said data in said memory.
7. A system including
   a processor, a memory bus coupled to said processor, and a memory coupled to said memory bus;

a plurality of mass storage devices and a secondary bus coupling said plurality of mass storage devices to said memory bus, whereby said secondary bus is used for transferring data to and from one of said plurality of mass storage devices; and an element coupled to said secondary bus, said element including a means for copying data transferred to and from one of said plurality of mass storage devices without interfering with said operation of transferring, and including a means for accumulating a result of an XOR operation for said data.

8. A system as in claim 7, wherein said means for copying includes a plurality of XOR accumulator buffers;

a first device memory used for matching a portion of a selected memory address with one of said plurality of XOR accumulator buffers;

an XOR operator coupled to said device memory and to said secondary bus, and used for performing an XOR operation on data in a second device memory and data associated with said selected memory address, and for writing a result of said XOR operation into said second device memory.

9. A system as in claim 7, including a DMA transfer element coupled to one of said plurality of mass storage devices; wherein said DMA transfer element includes a means for recognizing DMA transfers performed by said DMA transfer element, means for copying data from said DMA transfers; and wherein said means for accumulating is responsive to said means for recognizing and said DMA transfers.

10. A system as in claim 7, including a DMA transfer element coupled to one of said plurality of mass storage devices and used for performing a DMA transfer from said one of said plurality of mass storage devices and a selected memory location; wherein said selected memory location is ignored by said memory, whereby said DMA transfer to said selected memory location is effective to accumulate said result without storing data in said memory.

11. In a system having a processor, a memory, a memory bus coupling said processor and said memory, a plurality of mass storage devices, and a secondary bus coupling said plurality of mass storage devices to said memory bus, a data structure including a plurality of XOR accumulator buffers, each having a result of an XOR operation performed on data; and a table having a plurality of entries, each entry associating a portion of a memory address with one of said plurality of XOR accumulator buffers, said memory address being associated with said data.

\* \* \* \* \*

UNITED STATES PATENT AND TRADEMARK OFFICE
CERTIFICATE OF CORRECTION

PATENT NO : 5,950,225
DATED : September 7, 1999
INVENTOR(S): Steven R. Kleiman

It is certified that error appears in the above-identified patent and that said Letters Patent is hereby corrected as shown below:

Column 12, line 42, delete the word "to" before the word "accumulates."

Column 12, line 62, delete the word "to" before the word "accumulates."

Signed and Sealed this

Fifteenth Day of August, 2000

Attest:

Q. TODD DICKINSON

*Attesting Officer*  *Director of Patents and Trademarks*